US009297945B2

(12) United States Patent
Ide et al.

(10) Patent No.: US 9,297,945 B2
(45) Date of Patent: Mar. 29, 2016

(54) LIGHT SOURCE DEVICE AND PROJECTION DEVICE

(71) Applicant: CITIZEN HOLDINGS CO., LTD., Tokyo (JP)

(72) Inventors: Masafumi Ide, Saitama (JP); Shinpei Fukaya, Saitama (JP); Kaoru Yoda, Nagano (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/431,675

(22) PCT Filed: Jun. 17, 2014

(86) PCT No.: PCT/JP2014/066051
§ 371 (c)(1),
(2) Date: Mar. 26, 2015

(87) PCT Pub. No.: WO2015/012024
PCT Pub. Date: Jan. 29, 2015

(65) Prior Publication Data
US 2015/0241614 A1 Aug. 27, 2015

(30) Foreign Application Priority Data

Jul. 26, 2013 (JP) ................. 2013-155947

(51) Int. Cl.
*G02B 27/22* (2006.01)
*F21V 8/00* (2006.01)
(Continued)

(52) U.S. Cl.
CPC ............... *G02B 6/0005* (2013.01); *G02B 6/00* (2013.01); *G02B 26/0833* (2013.01);
(Continued)

(58) Field of Classification Search
CPC .......... F21V 8/00; G02B 26/08; G02B 27/01; G02B 27/22; G02B 6/00; G02B 27/2271; G02B 27/017; G02B 27/0172; G02B 6/0005; G02B 26/0833; G02B 2027/015; G02B 2027/0178
See application file for complete search history.

(56) References Cited

U.S. PATENT DOCUMENTS

| 5,548,677 A | 8/1996 | Kakii et al. |
| 2008/0018641 A1 | 1/2008 | Sparague et al. |

(Continued)

FOREIGN PATENT DOCUMENTS

| JP | S61-148485 A | 7/1986 |
| JP | H06-186457 A | 7/1994 |

(Continued)

OTHER PUBLICATIONS

International Search Report for PCT/JP2014/066051, Sep. 16, 2014.
(Continued)

*Primary Examiner* — Jennifer L. Doak

(57) ABSTRACT

Provided is a light source device having optical fiber arrays arranged so that different sets of RGB laser lights are focused at different depth positions, while enhancing the efficiency of light utilization. The light source device includes a plurality of optical devices each of which generate red, green, or blue laser light, a plurality of first, second, and third optical fibers through each of which the red, green, or blue laser light from a corresponding one of the plurality of optical devices is guided, and a fiber bundle combiner which forms a fiber bundle by fixedly holding together end portions of the plurality of first, second, and third optical fibers in such a manner that a plurality of optical fiber sets, each comprising three optical fibers one from the first optical fibers, one from the second optical fibers, and one from the third optical fibers, are stacked in layers.

5 Claims, 13 Drawing Sheets

(51) Int. Cl.
*G02B 6/00* (2006.01)
*G02B 27/01* (2006.01)
*G02B 26/08* (2006.01)

(52) U.S. Cl.
CPC ......... *G02B 27/017* (2013.01); *G02B 27/0172* (2013.01); *G02B 27/22* (2013.01); *G02B 27/2271* (2013.01); *G02B 2027/015* (2013.01); *G02B 2027/0178* (2013.01)

(56) References Cited

U.S. PATENT DOCUMENTS

2008/0117289 A1 5/2008 Schowengerdt et al.
2011/0216286 A1 9/2011 Matsumoto et al.
2015/0235471 A1* 8/2015 Schowengerdt ...... G06T 19/006 345/633

FOREIGN PATENT DOCUMENTS

| | | |
|---|---|---|
| JP | H07-209556 A | 8/1995 |
| JP | H10-020244 A | 1/1998 |
| JP | 2001-007403 A | 1/2001 |
| JP | 2001-333438 A | 11/2001 |
| JP | 2003-295116 A | 10/2003 |
| JP | 2005-500578 A | 1/2005 |
| JP | 2008-020560 A | 1/2008 |
| JP | 2008-509438 A | 3/2008 |
| JP | 2009-047993 A | 3/2009 |
| JP | 2010-152323 A | 7/2010 |
| WO | 03/017246 A1 | 2/2003 |

OTHER PUBLICATIONS

Brian T. Schowengerdt 44.1: Volumetric Display using Scanned Fiber Array SID Symposium Digest of Technical Papers vol. 41, Issue 1, pp. 653-656, May 2010.

* cited by examiner

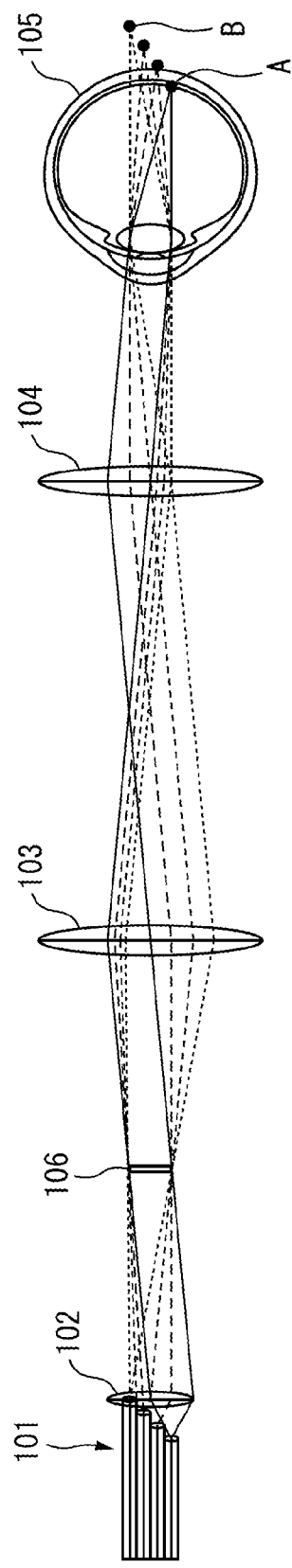
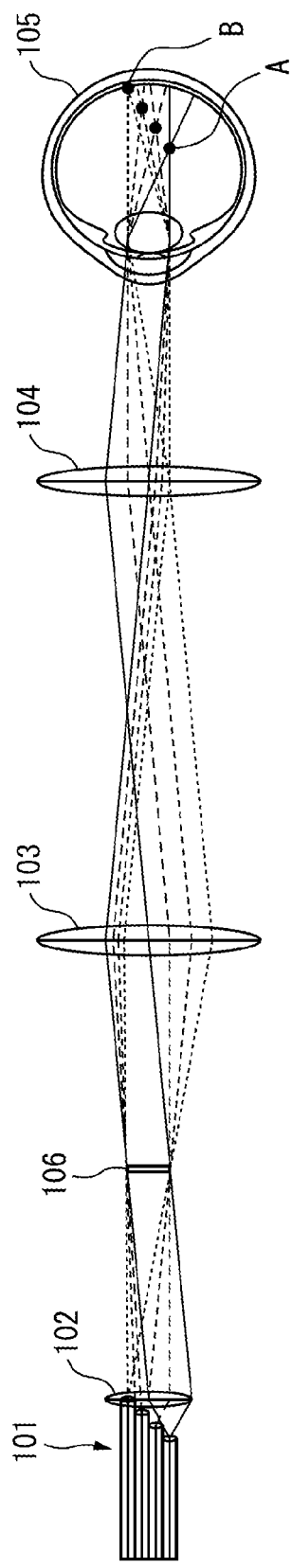
FIG. 16A
FIG. 16B

LIGHT SOURCE DEVICE AND PROJECTION DEVICE

TECHNICAL FIELD

The present invention relates to a light source device and a projection device.

BACKGROUND ART

An image display device is known that displays an image in a stereoscopic fashion. For example, patent document 1 discloses an image display device which includes a plurality of transparent fibers arranged in a two-dimensional matrix pattern, the length of each fiber being changed at the display end for each individual pixel which is the smallest unit forming a display screen, and light sources arranged uniformly behind the respective fibers. This image display device provides a sense of depth to the displayed image by changing the length of each fiber in a stepwise manner at the display end and thereby creating relative differences in height at the top ends of the respective fibers.

A three-dimensional display device for displaying a stereoscopic image, called a volumetric display, is also known (for example, refer to patent document 2). The volumetric display scans laser light from a light source by using a MEMS (Micro Electro Mechanical System) mirror, for example, so as to display images of cross sections of an object onto virtual screens stacked in multiple layers, and produces a stereoscopic image by combining the plurality of images. Among others, a retinal scanning volumetric display is known that projects a stereoscopic image directly into the human eye by scanning a plurality of laser lights of different focusing distances over the retina (for example, refer to non-patent document 1).

FIGS. 16A and 16B are diagrams for explaining the basic principle of the retinal scanning volumetric display. A plurality of laser lights from a plurality of optical fibers 101 respectively connected to a plurality of laser light sources are projected so that the respective laser lights are focused at different positions in the horizontal direction (depth direction) as indicated, for example, by black dots in the figures. In FIGS. 16A and 16B, the four laser lights projected from the optical fibers 101 into a viewer's eye 105 via projection lens 102, 103, and 104 are indicated by solid and dashed lines.

The plurality of laser lights are superimposed one on top of another to form a multifocal beam, which is scanned over the viewer's eye 105 by a scanner 106 to form a stereoscopic image with a plurality of images stacked in layers. For example, when a viewer adjusts his/her crystalline lens so as to bring point A onto the retina, as shown in FIG. 16A, the viewer has the sensation that the lens is focused on a distant object.

On the other hand, when the viewer adjusts his/her crystalline lens so as to bring point B onto the retina, as shown in FIG. 16B, the viewer has the sensation that the lens is focused on a near object. In this way, the viewer can perceive the depth when viewing the image presented by the volumetric display.

An array of a large number of fiber pigtail modules is used as the laser light source for the volumetric display. This, however, increases the overall size of the device; therefore, it is preferable to use an arrayed optical module as the laser light source in order to reduce the size of the device.

In non-patent document 1, it is described that an array of optical fibers respectively connected to a plurality of LD (laser diode) devices is used as the laser light source for the volumetric display. In the volumetric display of non-patent document 1, each optical fiber in the array is connected at one end to a corresponding one of the LD devices and cut at an angle at the other end, and the position in the depth direction of the image to be projected is controlled by varying the distance from the exit end face of each fiber to the retina.

CITATION LIST

Patent Documents

Patent document 1: Japanese Unexamined Patent Publication No. S61-148485
Patent document 2: Japanese Unexamined Patent Publication No. 2005-500578

Non-Patent Documents

Non-patent document 1: Brian T. Schowengerdt, Mrinal Murari, and Eric J. Seibel, "Volumetric Display using Scanned Fiber array," SID Symposium Digest of Technical Papers 41, pp. 653-656 (2010)

SUMMARY OF INVENTION

While non-patent document 1 provides a description with regard to the display of a color image, the light sources used are monochromatic red lasers, and no description is given of how the fibers should be arranged to achieve a multicolor capability. One possible method to provide a multicolor capability to the volumetric display would be to create all desired colors by combining red, green, and blue (RGB) laser lights using a fused fiber combiner. However, when the fused fiber combiner is used, since the coupling length over which the laser light is coupled from one waveguide to another waveguide with high efficiency is different for each wavelength, it is difficult to accurately adjust the coupling length so as to match each wavelength. As a result, crosstalk, etc., may occur between adjacent cores, reducing the efficiency of light utilization.

In view of the above, it is an object of the present invention to provide a light source device having optical fiber arrays arranged so that different sets of RGB laser lights are focused at different depth positions, while enhancing the efficiency of light utilization. It is also an object of the present invention to provide a projection device that can project multicolored images onto different depth positions.

Provided is a light source device including a plurality of first optical devices which generate red laser light, a plurality of first optical fibers through each of which the red laser light from a corresponding one of the plurality of first optical devices is guided, a plurality of second optical devices which generate green laser light, a plurality of second optical fibers through each of which the green laser light from a corresponding one of the plurality of second optical devices is guided, a plurality of third optical devices which generate blue laser light, a plurality of third optical fibers through each of which the blue laser light from a corresponding one of the plurality of third optical devices is guided, and a fiber bundle combiner which forms a fiber bundle by fixedly holding together end portions of the plurality of first optical fibers, the plurality of second optical fibers, and the plurality of third optical fibers in such a manner that a plurality of optical fiber sets, each including three optical fibers one from the plurality of first optical fibers, one from the plurality of second optical fibers, and one from the plurality of third optical fibers, are stacked in layers.

Preferably, in the above light source device, the plurality of first optical fibers, the plurality of second optical fibers, and the plurality of third optical fibers emit laser lights from exit end faces thereof so that the laser lights from different ones of the plurality of optical fiber sets are focused at different depth positions.

Preferably, in the above light source device, the end portions of the plurality of first optical fibers, the plurality of second optical fibers, and the plurality of third optical fibers are ground obliquely in a longitudinal direction of the fiber bundle so that the distance from the exit end face of laser light to a projection surface is different for each of the optical fiber sets.

Preferably, in the above light source device, a GI fiber whose length is different for each of the optical fiber sets is fused to the end portion of each of the plurality of first optical fibers, the plurality of second optical fibers, and the plurality of third optical fibers.

Preferably, in the above light source device, the fiber bundle combiner fixedly holds together the optical fibers so that the plurality of first optical fibers, the plurality of second optical fibers, and the plurality of third optical fibers form a hexagonal closest packed lattice in a cross section taken perpendicularly to the longitudinal direction of the fiber bundle, and the plurality of optical fiber sets stacked in layers are each arranged in a direction tilted by 60 degrees with respect to a direction in which the plurality of first optical fibers, the plurality of second optical fibers, and the plurality of third optical fibers are respectively arranged.

Preferably, in the above light source device, the fiber bundle combiner fixedly holds together the optical fibers so that the plurality of first optical fibers, the plurality of second optical fibers, and the plurality of third optical fibers form a tetragonal lattice in a cross section taken perpendicularly to the longitudinal direction of the fiber bundle, and the plurality of optical fiber sets stacked in layers are each arranged in a direction perpendicular to a direction in which the plurality of first optical fibers, the plurality of second optical fibers, and the plurality of third optical fibers are respectively arranged.

Preferably, in the above light source device, exit optical axes of the first optical fiber, second optical fiber, and third optical fiber in each of the optical fiber sets are oriented in the same order and in parallel to each other within the same plane.

Provided is a projection device including a light source unit which emits a plurality of sets of red, green, and blue laser lights, and a projecting unit which deflects and scans each of the plurality of sets of the laser lights in a two-dimensional manner and thereby projects images formed by the plurality of sets of the laser lights onto different depth positions. The light source unit includes a plurality of first optical devices which emit red laser light, a plurality of first optical fibers through each of which the red laser light from a corresponding one of the plurality of first optical devices is guided, a plurality of second optical devices which emit green laser light, a plurality of second optical fibers through each of which the green laser light from a corresponding one of the plurality of second optical devices is guided, a plurality of third optical devices which emit blue laser light, a plurality of third optical fibers through each of which the blue laser light from a corresponding one of the plurality of third optical devices is guided, and a fiber bundle combiner which forms a fiber bundle by fixedly holding together end portions of the plurality of first optical fibers, the plurality of second optical fibers, and the plurality of third optical fibers in such a manner that a plurality of optical fiber sets, each including three optical fibers one from the plurality of first optical fibers, one from the plurality of second optical fibers, and one from the plurality of third optical fibers, are stacked in layers. Each of the optical fiber sets emits one of the plurality of sets of the laser lights.

According to the above light source device, different sets of RGB laser lights can be focused at different depth positions, while enhancing the efficiency of light utilization, by bundling together the optical fibers with the fiber bundle combiner. According to the above projection device, multicolored images can be projected onto different depth positions.

BRIEF DESCRIPTION OF DRAWINGS

FIGS. 16A and 16B are diagrams for explaining the basic principle of the retinal scanning volumetric display.

DESCRIPTION OF EMBODIMENTS

Hereinafter, with reference to the accompanying drawings, a light source device and a projection device will be explained in detail. However, it should be noted that the technical scope of the present invention is not limited to embodiments thereof, and includes the invention described in claims and equivalents thereof.

An eyeglass-type volumetric display will be described below as an example of a projection device that uses a light source device as a light source unit. However, the projection device is not limited to the eyeglass type, the only requirement being that it be a volumetric display that projects a stereoscopic image by focusing different sets of RGB laser lights onto different depth positions.

Figure 1:
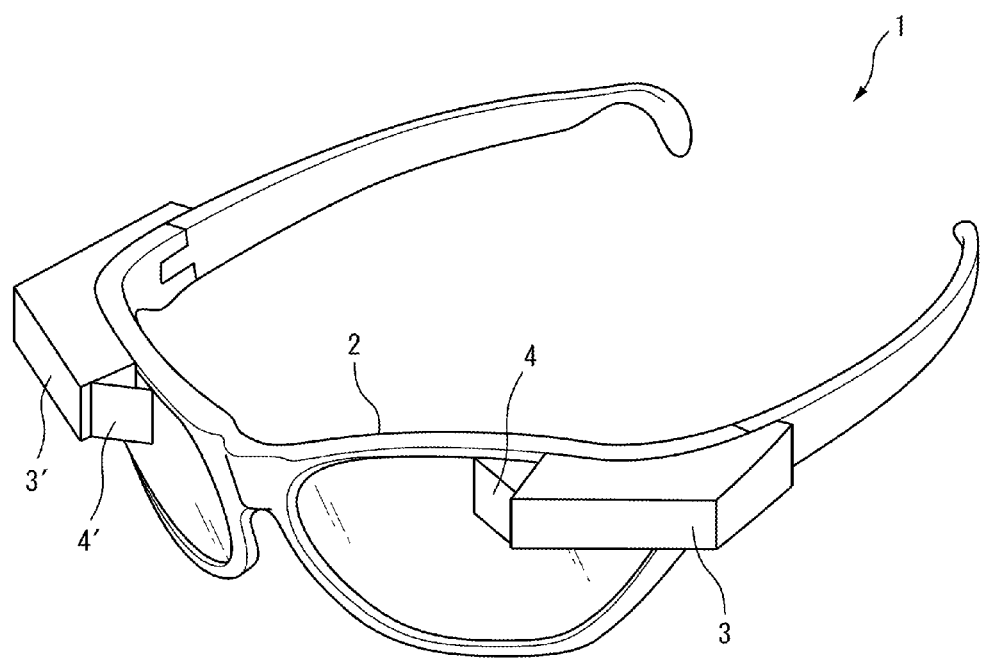
FIG. 1 is a perspective view of the eyeglass-type volumetric display 1.

FIG. 1 is a perspective view of an eyeglass-type volumetric display 1. The volumetric display 1 is a near-to-eye (NTE)

display which is mounted on the head of a user and which presents an image for viewing by projecting laser light onto the retina of the user's eye.

As shown in FIG. 1, the volumetric display 1 includes an eyeglass frame 2, projection units 3 and 3', and half-silvered mirrors 4 and 4'. Like a conventional eyewear, the eyeglass frame 2 has a head-mountable shape. The projection units 3 and 3' each have a substantially L-shaped structure and are mounted on the left and right eyeglasses, respectively. The half-silvered mirrors 4 and 4' are mounted on the ends of the respective projection units 3 and 3' in such a manner that when the eyeglass frame 2 is mounted on the user's head, the half-silvered mirrors 4 and 4' are positioned so as to be opposed to the user's left and right eyes, respectively. Since it is necessary to also reproduce binocular parallax in order to present a natural stereoscopic display, it goes without saying that the projection units are mounted for the left and right eyes, respectively, and that different images created by considering binocular parallax are displayed by the respective projection units. Since the projection units 3 and 3' are identical in configuration, the following description deals only with the projection unit 3.

Figure 2:
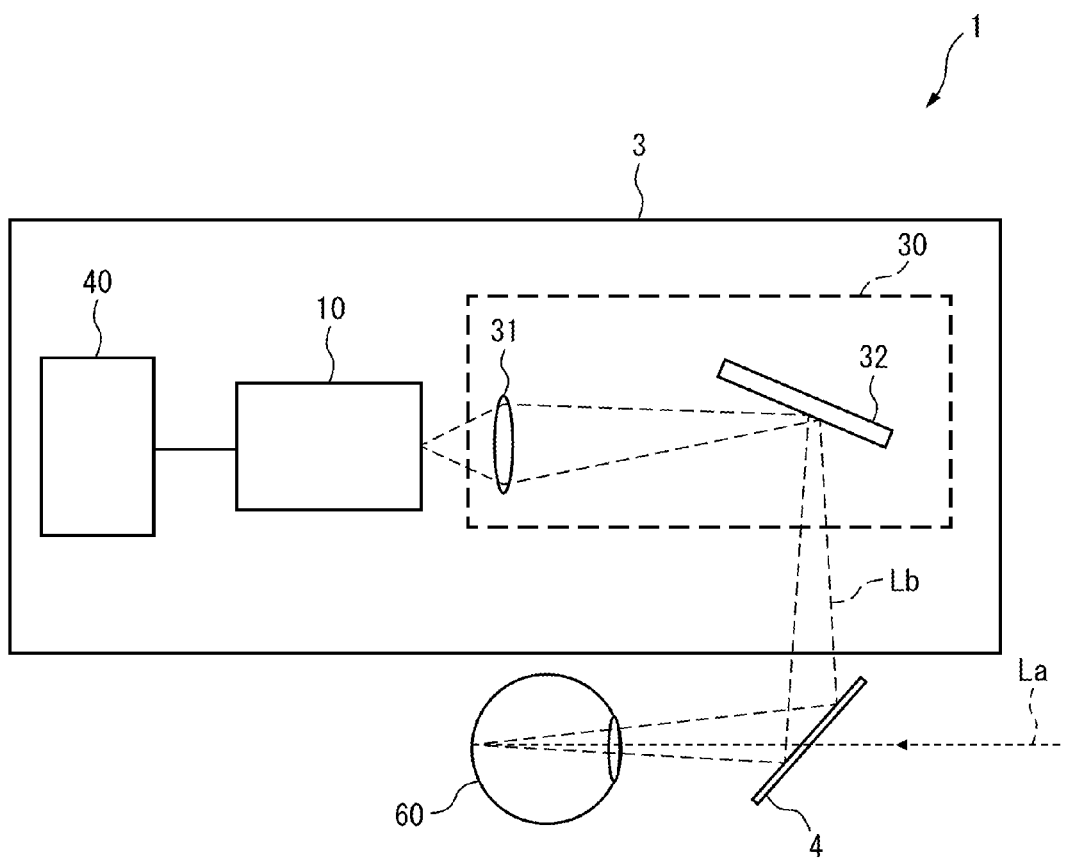
FIG. 2 is a diagram schematically illustrating the configuration of the projection unit 3 of the volumetric display 1.

FIG. 2 is a diagram schematically illustrating the configuration of the projection unit 3 of the volumetric display 1. The projection unit 3 contains a light source unit 10, a projecting unit 30, and a control unit 40. The light source unit 10 is one example of the light source device, and emits laser light of intensities proportional to image signals. The projecting unit 30 scans the transmitted laser light to project an image into the user's left eye. Based on the image data of the image to be projected, the control unit 40 controls the emission timing, emission intensity, etc., of the laser light of each color to be emitted from the light source unit 10.

The projecting unit 30 includes a projection lens 31 and a MEMS mirror 32. The projection lens 31 shapes the RGB laser light emitted from the light source unit 10 so that the RGB laser light will be projected onto the MEMS mirror 32. The MEMS mirror 32 is driven by a driver (not shown) in a rapid, swinging fashion, for example, in horizontal and vertical directions. The MEMS mirror 32 deflects laser light Lb focused through the projection lens 31 and redirects it into the user's left eye 60, and scans the laser light over the retina of the user's eye in a two-dimensional fashion. In this way, the volumetric display 1 uses the retina of the user' eye as the projection surface onto which the image is projected. The user views the image corresponding to the image signal through the light scanned over the retina.

As shown in FIG. 2, the laser light Lb emitted from the projecting unit 30 is reflected by the half-silvered mirror 4 and enters the user's left eye 60, and at the same time, ambient light La passed through the half-silvered mirror 4 also enters the left eye. That is, the volumetric display 1 is the so-called see-through type projection device that produces a display by superimposing the projected image produced by the laser light Lb onto the surrounding environment made visible by the ambient light La. However, this is only one example, and the projection device need not necessarily be limited to the see-through type.

Figure 3A:
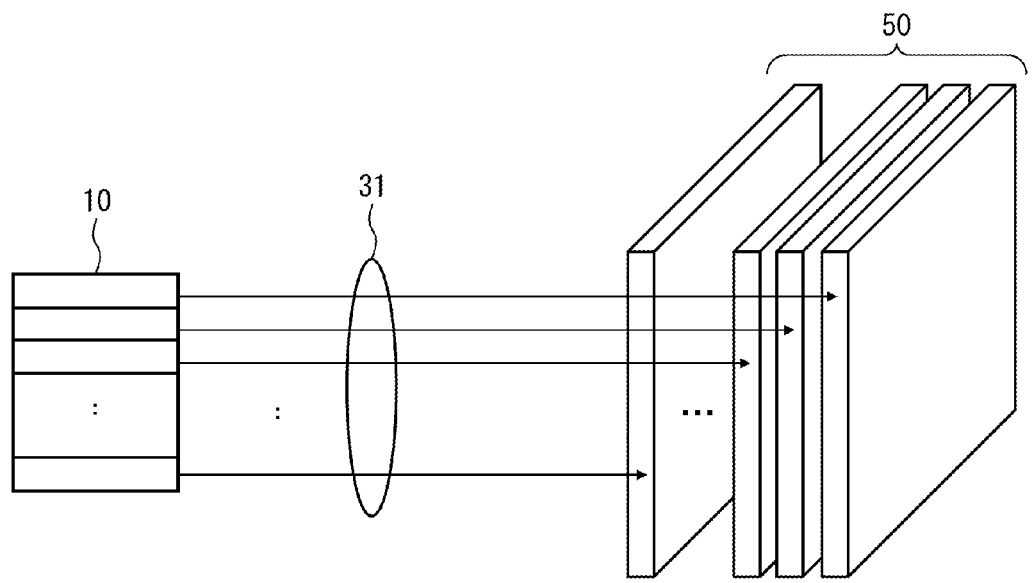
FIGS. 3A and 3B are diagrams for explaining how a stereoscopic image is projected by the volumetric display 1.
Figure 3B:
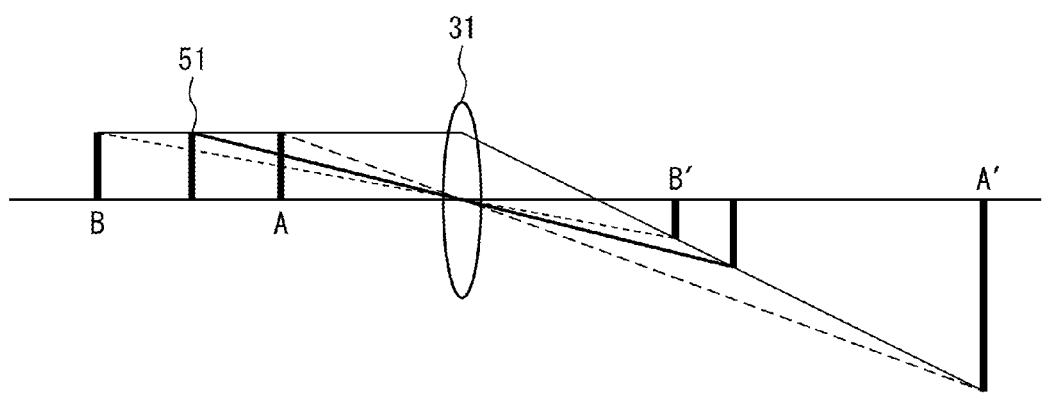

FIGS. 3A and 3B are diagrams for explaining how a stereoscopic image is projected by the volumetric display 1.

FIG. 3A is a diagram showing layers 50 formed at different depth positions. In the volumetric display 1, different sets of RGB laser lights emitted from the light source unit 10 are focused at different depth positions to form a stereoscopic image with a plurality of images stacked in layers. By stacking two-dimensional images one on top of another in this manner, the volumetric display 1 allows the user to perceive the depth of the projected image. The layers formed at different depth positions are thought of as being virtual screens. Generally, when there are six or so layers, the user can perceive the depth. In the volumetric display 1, the number of layers 50 is, for example, ten, and the light source unit 10 includes ten sets of RGB laser light sources to correspond with the number of layers.

FIG. 3B is a diagram illustrating how the focus position changes when the light emitting point is moved backward and forward. As shown in FIG. 3B, when the emitting point 51 is moved forward to a position A closer to the projection lens 31, the light from the emitting point 51 is focused at a farther position A' because the light enters the projection lens 31 at a larger angle. Conversely, when the emitting point 51 is moved backward to a position B away from the projection lens 31, the light from the emitting point 51 is focused at a nearer position B' because the light enters the projection lens 31 at a smaller angle. The focus position thus changes when the light emitting point is moved backward and forward relative to the projection lens 31. In view of this, in the volumetric display 1, the ten sets of RGB laser lights corresponding to the ten layers 50 are arranged so that their emitting points are located at respectively different distances relative to the projection lens 31. Then, in the volumetric display 1, the ten sets of RGB laser lights with their emitting points located at different distances are scanned to display images on the ten layers 50, respectively.

Figure 4:
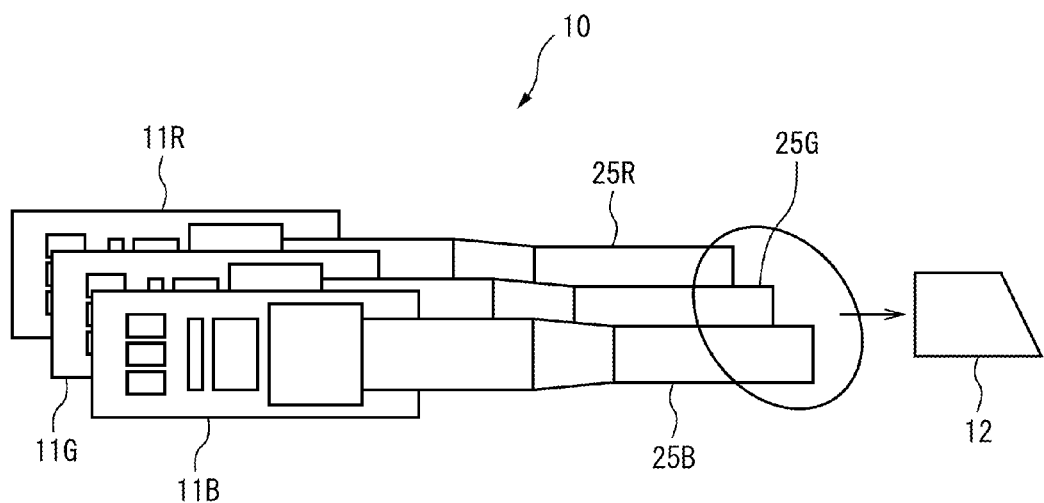
FIG. 4 is a diagram schematically illustrating the configuration of the light source unit 10.

FIG. 4 is a diagram schematically illustrating the configuration of the light source unit 10. The light source unit 10 includes an optical module 11R, an optical module 11G, an optical module 11B, and a fiber bundle combiner 12.

The optical module 11R is one example of the first optical module, and emits red laser light through a fiber array 25R. The optical module 11G is one example of the second optical module, and emits green laser light through a fiber array 25G. The optical module 11B is one example of the third optical module, and emits blue laser light through a fiber array 25B.

The light source unit 10 uses the three optical modules, one for each color, as the RGB light sources. The optical modules 11R, 11G, and 11B are substantially identical in configuration, and may hereinafter be referred to collectively as the "optical modules 11."

The fiber bundle combiner 12 is constructed, for example, from silica glass, and forms a fiber bundle by fixedly bundling together the fiber arrays 25R, 25G, and 25B extending from the respective modules. More specifically, the fiber bundle combiner 12 forms the fiber bundle by fixing the end portions of the fibers in such a manner that a plurality of sets of three optical fibers, one from each of the fiber arrays 25R, 25G, and 25B, are stacked in layers. In this way, in the light source unit 10, the RGB optical fibers from the respective optical modules 11 are bundled together by the fiber bundle combiner 12, rather than bundling them together after combining the RGB lights.

The fiber arrays 25R, 25G, and 25B are each made up of, for example, ten optical fibers, to correspond with the number of layers in the volumetric display 1. Thus, in the light source unit 10, ten optical fiber sets each including three RGB optical fibers are stacked in layers and arrayed together. Then, the respective optical fiber sets emit laser lights to be focused at different depth positions corresponding to the ten layers 50.

The laser lights of different colors emitted from the exit end faces of the respective fibers are passed through the projection lens 31, scanned by the MEMS mirror 32, and projected onto the projection surface (retina), as previously described. However, if the RGB fibers are simply bundled together by the fiber bundle combiner 12, the projection points of the RGB lights may become displaced relative to each other since the fiber cores are spaced a certain distance apart from each other, and the resulting image may appear blurred. To address this, the displacement that may occur in the projected image due to the displacements of the emitting positions of the respective fibers is measured in advance, and the RGB emission timing for each layer and the scanning timing of the MEMS mirror 32 are adjusted in advance, thus correcting the projected image for any displacement including fabrication errors. Further, using, for example, a time-of-flight (TOF) method, a pattern projection method, or a pattern recognition method involving image processing, the control unit 40 performs eye tracking by measuring the motion of the eyeball, for example, either by measuring the time of flight of light from the time infrared light is radiated from a detector not shown to the time the reflected light is received by the detector, or through pattern recognition by processing an image acquired by an image sensor constructed from an near-infrared CMOS or CCD camera. In this way, the control unit 40 can perform control to change the position of the projected image in response to the motion of the eyeball.

Figure 5:
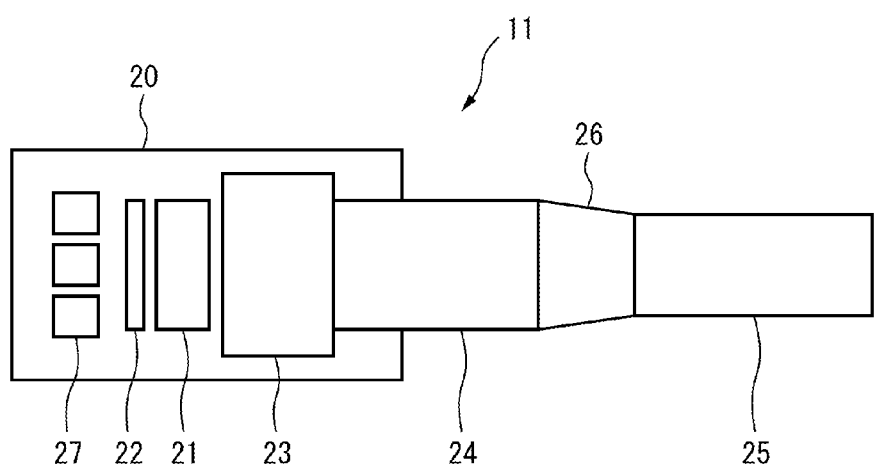
FIG. 5 is a diagram schematically illustrating the configuration of the optical module 11.

FIG. 5 is a diagram schematically illustrating the configuration of the optical module 11. The optical module 11 is an arrayed optical module that is equipped with an LD array emitting the designated color in order to multiplex (spatially multiplex) the light sources of the same wavelength (color) for each layer 50 in the volumetric display 1. The optical module 11 includes a silicon substrate 20, an LD array 21, a PD (photodiode) array 22, a sub-substrate 23, a first fiber array 24, a second fiber array 25, a fiber connector 26, and a driver IC 27. The LD array 21, PD array 22, sub-substrate 23, first fiber array 24, and driver IC 27 are mounted on the silicon substrate 20.

The silicon substrate 20 is, for example, a TSV substrate which is formed with through-silicon vias (TSVs) passing through the substrate from the top to the bottom thereof, and which is electrically connected to a circuit substrate, not shown, via solder bumps provided in a clustered manner on the bottom surface. Alternatively, the silicon substrate 20 may be constructed from an FPC (Flexible Printed Circuit) substrate.

The LD array 21 is constructed from a plurality of direct lasers that emit light of the same color, red, green, or blue. The LD array 21 in the optical module 11R is one example of the plurality of first optical devices all of which emit red laser light. The LD array 21 in the optical module 11G is one example of the plurality of second optical devices all of which emit green laser light. The LD array 21 in the optical module 11B is one example of the plurality of third optical devices all of which emit blue laser light. The LD array 21 is driven by a current supplied from the driver IC 27. Each LD array 21 is individually modulated so as to produce an output of intensity synchronized to the MEMS mirror 32.

The LD array 21 is mounted on the silicon substrate 20 by surface activated bonding via micro bumps provided on the upper surface of the silicon substrate 20. The surface activated bonding is a technique that activates material surfaces by removing inactive layers such as oxides, dirt (contaminants), etc., covering the material surfaces by Ar (argon) plasma or other processing, and that bonds the surfaces together at normal temperatures by causing atoms having high surface energy to contact each other and by utilizing the adhesion forces acting between the atoms under a high load.

Alternatively, the LD array 21 may be constructed from laser devices that emit light in the infrared region of the spectrum, and a PPLN (Periodically Poled Lithium Niobate) array (not shown) may be provided so as to be optically coupled to the respective laser devices; then, the light generated by each LD device may be wavelength-converted into the laser light of the corresponding color for output. The term "optically coupled" means that the optical devices are positioned relative to each other so that the light emitted from one optical device can be directly input into the other optical device.

Since the ten optical fiber sets each including three RGB optical fibers are stacked in layers and bundled together by the fiber bundle combiner 12, each LD array 21 must contain at least ten LD devices that emit the laser light of the corresponding color. A production batch of LD devices generally contains a certain percentage of defectives, but when constructing the LD array 21 from bare chips, it is not possible to verify its operation until after all of the devices have been mounted. In view of this, a certain amount of redundancy is provided by constructing the LD array 21 using more than ten LD devices so that any defectives can be eliminated after burn-in (aging under electrical stresses).

Unlike laser modules for optical communications, laser modules for laser displays emit light over a wide wavelength range (RGB). As a result, the material, composition, and structure must be made different for each of the RGB lasers, and the wafer size is also different. Therefore, the number of devices must be determined for each of the optical modules 11R, 11G, and 11B by considering the differences in the production yield for each color, because the LD device defect rate is different for each color. For example, if ten non-defective devices corresponding to the number of layers in the volumetric display 1 are to be obtained consistently, the number of devices used to construct the LD array 21 must be changed for each color. Therefore, in the light source unit 10, the number of devices used to construct the LD array 21 is changed for each color, for example, 17 for the optical module 11R (red laser), 15 for the optical module 11G (green laser), and 16 for the optical module 11B (blue laser).

For example, if the number of devices constituting the LD array 21 is 15, then even if a maximum of five devices are rendered defective in the burn-in process, the entire laser module is prevented from being rendered defective. By thus incorporating redundancy into the design of the LD array 21, the fabrication yield of the optical module 11 improves.

The PD array 22 is constructed from a plurality of photodiodes provided so as to correspond one for one with the respective LD devices in the LD array 21 and disposed on the upstream side of the respective LD devices when viewed in the direction of laser light emission. Each photodiode in the PD array 22 receives backward light from the corresponding LD device and monitors the amount of light from it. The PD array 22 is mounted on the silicon substrate 20 by surface activated bonding in the same manner as the LD array 21.

Since the current vs. light output characteristics of each LD device change with age, it is preferable to monitor the amount of light from it and perform feedback control in order to maintain the output at a constant level. Therefore, in the optical module 11, the PD array 22 monitors the amount of light from each LD device, and the driver IC 27 controls the drive current to the LD device in accordance with the detected amount of light so that the amount of light from the LD device is maintained at a constant level.

The sub-substrate 23 is, for example, an inverted U-shaped substrate the lower surface of which is formed with grooves for holding the first fiber array 24. The sub-substrate 23 is bonded to the silicon substrate 20, and fixedly holds the end portion of the first fiber array 24. The sub-substrate 23 is constructed using a silicon substrate or glass substrate. The sub-substrate 23 is mounted on the silicon substrate 20 by surface activated bonding in the same manner as the LD array 21. GI (Graded Index) lenses as coupling members may be provided integrally with the end portion of the sub-substrate 23. Further, the sub-substrate 23 may be constructed from a V-grooved substrate instead of an inverted U-shaped substrate.

Each fiber in the first fiber array 24 is a few-mode or single-mode optical fiber that is matched to the wavelength used and through which the laser light emitted from the LD array 21 is guided. With the sub-substrate 23 bonded to the silicon substrate 20, the end portion of the first fiber array 24 is optically coupled to each device in the LD array 21. The number of fibers constituting the first fiber array 24 is the same as the number of devices constituting the LD array 21. For example, in the optical modules 11R, 11G, and 11B, since the number of devices constituting the LD array 21 is 17, 15, and 16, respectively, the number of fibers constituting the first fiber array 24 is also 17, 15, and 16, respectively. Further, in order to facilitate the alignment with the respective devices in the LD array 21, fibers with a relatively large diameter, for example, a 6-µm diameter, are used in the first fiber array 24.

Each fiber in the second fiber array 25 has one end optically coupled to the first fiber array 24 via the fiber connector 26. Each fiber in the second fiber array 25 is a few-mode or single-mode optical fiber that is matched to the wavelength used and through which the laser light emitted from the LD array 21 is guided to the outside of the optical module 11. The second fiber arrays 25 in the optical modules 11R, 11G, and 11B correspond respectively to the fiber arrays 25R, 25G, and 25B shown in FIG. 4. The second fiber array 25 in each of the optical modules 11R, 11G, and 11B is fixed by the fiber bundle combiner 12 at the end opposite to the end connected to the fiber connector 26, and emits laser light of the corresponding color from that opposite end.

The number of fibers in the second fiber array 25 is ten to correspond with the number of layers in the volumetric display 1. Unlike the first fiber array 24, the number of fibers constituting the second fiber array 25, which is determined by the number of layers in the volumetric display 1, is the same for all of the optical modules 11R, 11G, and 11B.

Since the first fiber array 24 is constructed using a redundant number of fibers to match the number of devices in the LD array 21, the number of fibers constituting the second fiber array 25 is smaller than the number of fibers constituting the first fiber array 24. Accordingly, the fibers in the second fiber array 25 are connected to the selected fibers in the first fiber array 24 via the fiber connector 26. The fibers to which the fibers in the second fiber array 25 are to be connected are selected so that the fibers are connected only to the non-defective LD devices after eliminating defectives from the LD array 21 by burn-in in the fabrication process of the optical module 11.

Further, fibers with a diameter, for example, a 4-µm diameter, that is smaller than the diameter of the fibers used in the first fiber array 24 are used in the second fiber array 25. By converting the mode field diameter, fibers with a larger diameter (for example, 6 µm) are used in the first fiber array 24 located nearer to the LD array 21 in order to facilitate the alignment, and in the case of a one-to-one projection system, fibers with a diameter (for example, 4 µm) that matches the size of the photoreceptor cell in the retina of the human eye are used in the second fiber array 25 located nearer to the eyeball so that an image free from blurring can be displayed.

The first and second fiber arrays 24 and 25 in the optical module 11R are each an example of the plurality of first optical fibers. The first and second fiber arrays 24 and 25 in the optical module 11G are each an example of the plurality of second optical fibers. The first and second fiber arrays 24 and 25 in the optical module 11B are each an example of the plurality of third optical fibers.

The fiber connector 26 is a connector for connecting the first fiber array 24 to the second fiber array 25. A commercially available connector of a conventional type may be used as the fiber connector 26.

The driver IC 27 is mounted on the upper surface of the silicon substrate 20 by soldering. The driver IC 27 is an electronic component for driving the LD array 21, etc., and includes at least the function of controlling the supply of current required to drive the LD array 21. The driver IC 27 preferably includes a digital interface, and more preferably includes a core unit such as a CPU and memory as a control unit.

Figure 6:
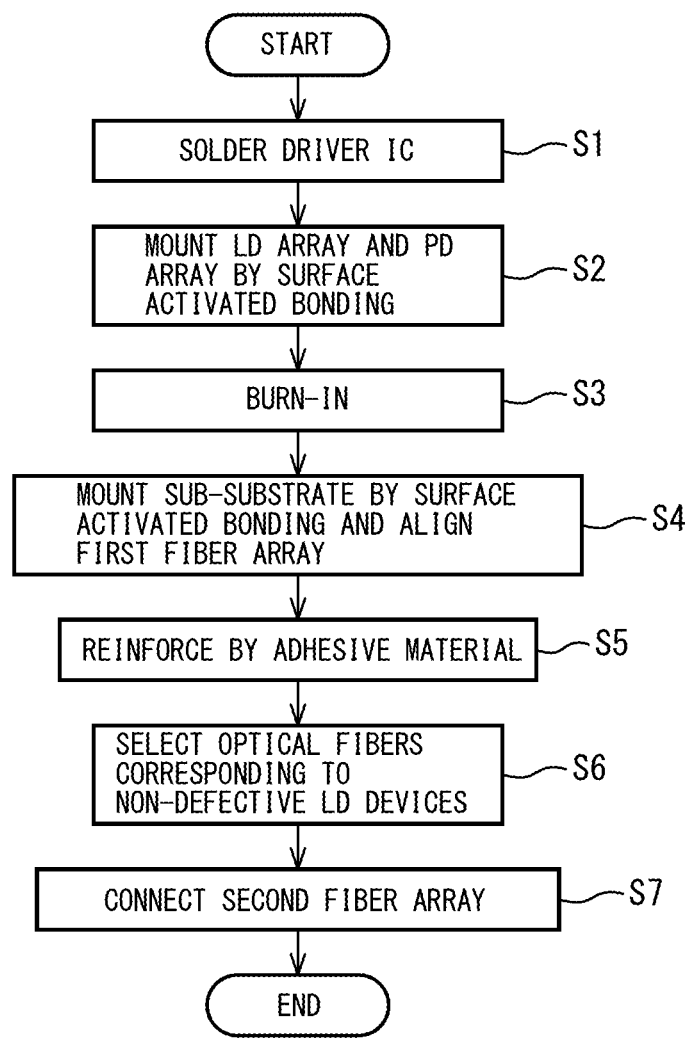
FIG. 6 is a flowchart illustrating a fabrication process for the optical module 11.

FIG. 6 is a flowchart illustrating a fabrication process for the optical module 11. First, the driver IC 27 is soldered to the silicon substrate 20 (step S1). After that, the LD array 21 and PD array 22 are bonded to the silicon substrate 20 by passive alignment and surface activation (step S2). In step S2, the positions of the LD array 21 and PD array 22 relative to the silicon substrate 20 are determined by registering, for example, the alignment marks provided on the LD array 21 and PD array 22 with the alignment marks provided on the silicon substrate 20. By thus performing the surface activated bonding after the soldering is done, the optical devices can be mounted without subjecting the optical devices in the LD array 21, etc., to the soldering heat.

In this condition, burn-in is performed to check whether the LD array 21 contains any defectives (step S3). Next, the first fiber array 24 is fixed to the sub-substrate 23, and the two members are bonded to the silicon substrate 20 by active alignment and surface activation (step S4). In step S4, the LD array 21 is caused to emit laser light while changing the position of the sub-substrate 23 relative to the silicon substrate 20 and, based on the intensity of the light being emitted through the first fiber array 24, the position of the sub-substrate 23 relative to the silicon substrate 20 is determined. Further, the bonding of the sub-substrate 23 is reinforced by using an adhesive material (step S5).

Then, ten optical fibers corresponding to the number of layers in the volumetric display 1 are selected from among the optical fibers in the first fiber array 24 that are connected to the LD devices confirmed to be non-defective in step S3 (step S6). The optical fibers in the second fiber array 25 are connected via the fiber connector 26 to the ten optical fibers selected in step S6 from the first fiber array 24 (step S7). Then, the fabrication process of the optical module 11 is terminated.

The burn-in in step S3 may be performed after the first fiber array 24 and sub-substrate 23 have been mounted on the silicon substrate 20 in step S4.

By configuring the LD devices and the optical fibers into arrays as described above, the optical module 11 has the advantage that the alignment between the LD devices and the optical fibers can be accomplished at once. Furthermore, since the LD array 21 corresponding to a designated one of the RGB colors is mounted on the silicon substrate 20 of a corresponding one of the optical modules 11R, 11G, and 11B, the LD devices for each of the RGB colors can be individually tested by burn-in, as in the case of conventional LD devices. Further, by designing the LD array 21 with redundancy so as to be able to perform the burn-in test after mounting the LD array 21 on the silicon substrate 20, the fabrication yield of the optical module 11 can be further improved.

Since the optical modules 11R, 11G, and 11B are provided one for each of the laser colors, the amount of redundancy to be incorporated into the design of the LD array 21 can be varied by considering the defect rate which varies depending on such factors as the materials, compositions, and structures of the laser devices of different colors. For example, there may arise a need to minimize the amount of redundancy for the green and blue lasers because their materials are expensive, while the amount of redundancy for the red laser may be allowed to increase because its material is inexpensive; with the above configuration, it becomes possible to flexibly address such a need.

Next, a description will be given of a specific method of how the focus positions of the ten sets of RGB laser lights emitted from the light source unit 10 are moved backward and forward so as to match the ten layers in the volumetric display 1.

The projection of images on the plurality of layers can be accomplished in two ways. The first method is to grind the exit end faces of the fiber arrays 25R, 25G, and 25B obliquely in the direction of emission of each corresponding color laser light so that the exit end faces of the three RGB fibers in the optical fiber set associated with the same layer are located at the same distance from the projection lens 31. That is, in the first method, the end portions of the fibers are ground obliquely in the longitudinal direction of the fiber bundle in such a manner that the distance from the laser light exit end face to the projection surface becomes different for each optical fiber set. The second method is to fuse a GI fiber to each of the ends of the fiber arrays 25R, 25G, and 25B on the projection lens 31 side thereof so that the spreading angle of the laser light becomes different for each optical fiber set of three RGB fibers. These two methods will be described below in order.

First, a description will be given of the first method in which the exit end faces of the fiber arrays 25R, 25G, and 25B are ground obliquely in the direction of emission of each corresponding color laser light. In this case, the direction of grinding is different, depending on how the fibers bundled together by the fiber bundle combiner 12 are arranged.

Figure 7:
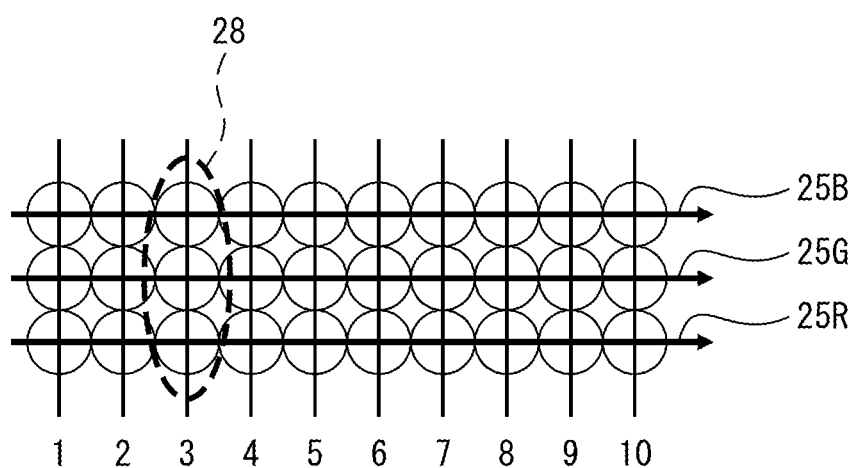
FIG. 7 is a diagram showing a first arrangement example of the fiber arrays 25R, 25G, and 25B.

FIG. 7 is a diagram showing a first arrangement example of the fiber arrays 25R, 25G, and 25B. FIG. 7 shows cross sections of the end portions of the fiber arrays 25R, 25G, and 25B bundled together by the fiber bundle combiner 12. The first arrangement example concerns the case in which the fiber arrays 25R, 25G, and 25B are bundled together by the fiber bundle combiner 12 to form a fiber bundle so that the fibers form a tetragonal lattice in the cross section taken perpendicularly to the longitudinal direction thereof.

In the case of the tetragonal lattice, the direction of arrangement of the optical fiber set 28 associated with each particular layer is perpendicular to the direction of arrangement of each of the fiber arrays 25R, 25G, and 25B indicated by arrows in FIG. 7. More specifically, in the case of the tetragonal lattice, the RGB optical fiber sets 28, the fibers in each optical fiber set being arranged in the same order along the vertical direction in FIG. 7, are stacked one on top of another in ten layers in the direction of arrangement of each of the fiber arrays 25R, 25G, and 25B.

Figure 8:
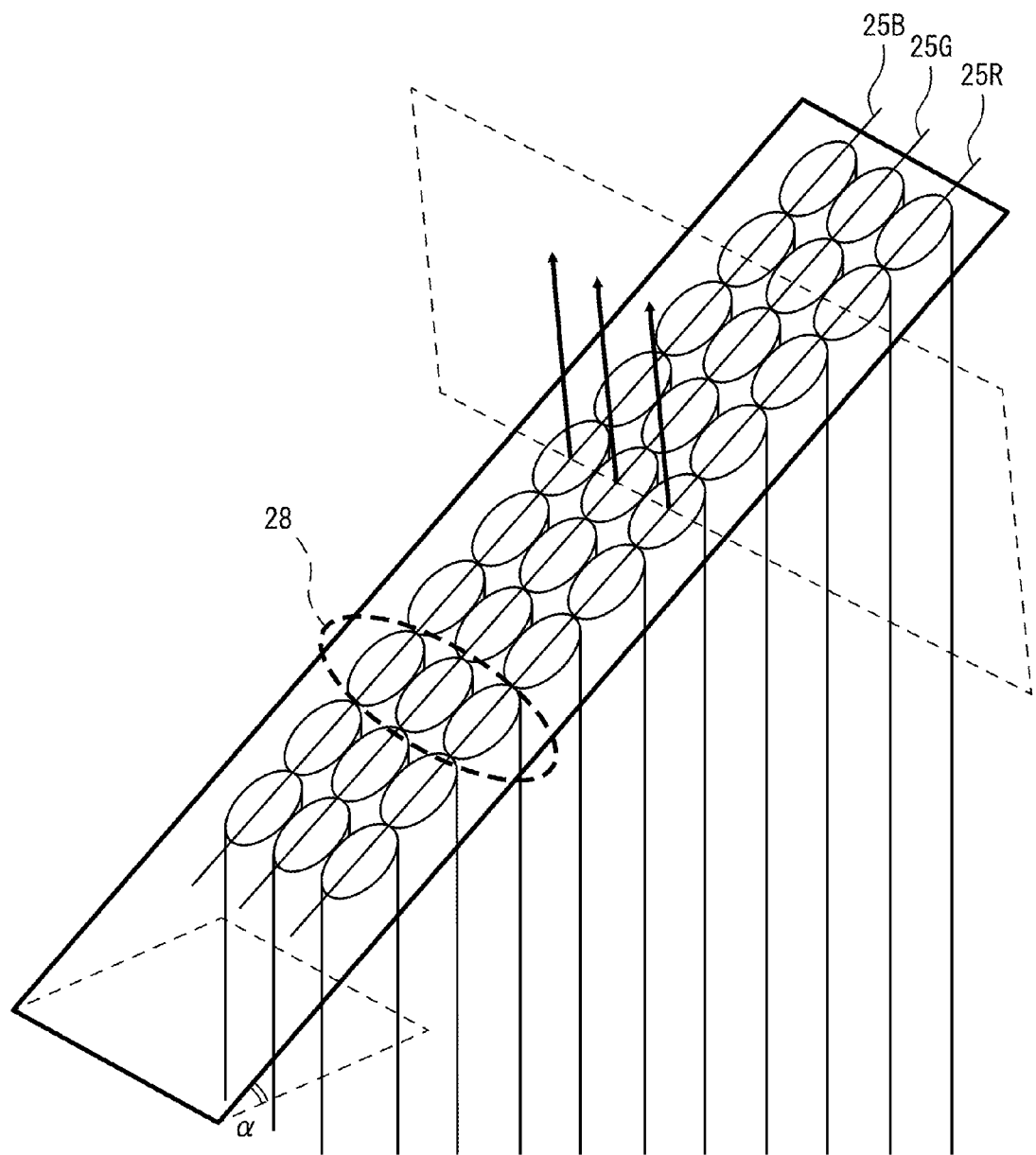
FIG. 8 is a diagram showing the direction in which the exit end faces of the fiber arrays 25R, 25G, and 25B are oriented in the first arrangement example.

FIG. 8 is a diagram showing the direction in which the exit end faces of the fiber arrays 25R, 25G, and 25B are oriented in the first arrangement example. As indicated by arrows in FIG. 8, the exit optical axes of the RGB optical fibers in each optical fiber set 28 are oriented in the same order and in parallel to each other within the same plane.

As is apparent from the description previously given with reference to FIG. 3B, the emitting points of the RGB lights to be focused on the same layer must be located at the same distance from the projection lens 31. Therefore, the fiber bundle is ground obliquely so that the exit end faces of the fibers in the optical fiber set 28 associated with one layer are disposed at the same distance from the projection lens 31. More specifically, the fiber bundle is ground obliquely so that the distance from the exit end face to the projection lens 31 becomes the same for each fiber in each of the optical fiber sets 28 indicated by numbers 1 to 10 in FIG. 7. The angle α that the exit end face of each fiber makes with the cross section taken perpendicularly to the longitudinal direction of the fiber shown in FIG. 8 is determined by the refractive index of the fiber, but is preferably set at about 42 degrees, as will be described later. The color laser lights emitted from the fiber bundle are transformed in position and angle by the projection lens 31 and scanned in a two-dimensional direction by the MEMS mirror 32 to project an image on each layer in the volumetric display 1.

Figure 9:
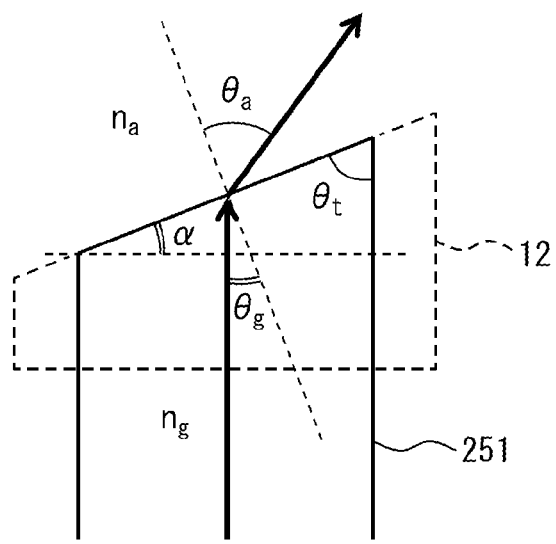
FIG. 9 is a diagram for explaining the refraction of light at the obliquely ground exit end face of each fiber.

FIG. 9 is a diagram for explaining the refraction of light at the obliquely ground exit end face of each fiber. A preferred angle of the exit end face of each optical fiber will be described with reference to FIG. 9.

FIG. 9 shows an enlarged view of a portion containing the exit end face (interface) of one optical fiber 251 in the fiber arrays 25R, 25G, and 25B. The core material of single-mode fiber (SMF) is, for example, silica glass. At the interface, the laser light is emitted into the air from the silica glass. Let $n_g$ denote the effective refractive index of the core portion, $\theta_g$ denote the angle of incidence, $n_a$ denote the refractive index of air, and $\theta_a$ denote the angle of emergence; then, from Snell's law, the following equation holds.

$$n_g \cdot \sin \theta_g = n_a \cdot \sin \theta_a \qquad (1)$$

Set $n_a=1$; then, from the equation (1), the following equation is obtained.

$$\sin \theta_a = n_g \cdot \sin \theta_g \qquad (2)$$

Let $\theta_t$ denote the tip angle of the fiber bundle combiner 12; then, from FIG. 9, the following equation is obtained.

$$\theta_g = \pi/2 - \theta_t \qquad (3)$$

The tip angle $\theta_t$ represents the angle of the exit end face relative to the longitudinal direction of the optical fiber 251, and the relation $\theta_t + \alpha = \pi/2$ (that is, $\theta_g = \alpha$) holds with respect to the angle α in FIG. 8. Substituting the equation (3) into the equation (2) and considering the relation $\sin \theta_a < 1$, the following relation is obtained.

$$\cos \theta_t < 1/n_g \qquad (4)$$

For example, in the case of $n_g=1.43$, since $\cos \theta_t < 0.699$ from the equation (4), the condition $$\theta_t > 45.63 \text{ deg.}$$

must be satisfied to prevent the occurrence of total internal reflection at the interface. Similarly, in the case of $n_g=1.46$, the condition $$\theta_t > 46.77 \text{ deg.}$$

and in the case of $n_g=1.5$, the condition $$\theta_t > 48.19 \text{ deg.}$$

must be satisfied to prevent the occurrence of total internal reflection at the interface.

In order to emit laser light to be focused at a designated depth position which is different for each optical fiber set, it is preferable to set the tip angle $\theta_t$ of the fiber bundle combiner 12 as small as possible. However, from the effective refractive index at the wavelength of the optical fiber used, although it depends on the wavelength, the tip angle $\theta_t$ of the fiber bundle combiner 12 must be chosen so as to satisfy the condition defined by the relation (4). For example, in the case of a silica-based fiber doped with GeO$_2$, the effective refractive index n$_g$ of the core portion is about 1.463 to 1.467 (1.55 μm). Accordingly, in the case of the silica-based fiber, it is preferable to set the tip angle θ$_t$ of the fiber bundle combiner 12 at about 48 degrees by allowing some leeway. This means that it is preferable to set the angle α in FIG. 8 at about 42 degrees.

When θ$_a$ is 90 degrees, θ$_g$ is equal to the critical angle, and when θ$_g$ is greater than the critical angle, total internal reflection occurs at the interface since, theoretically, there is no transmitted light propagating far into the air.

Figure 10:
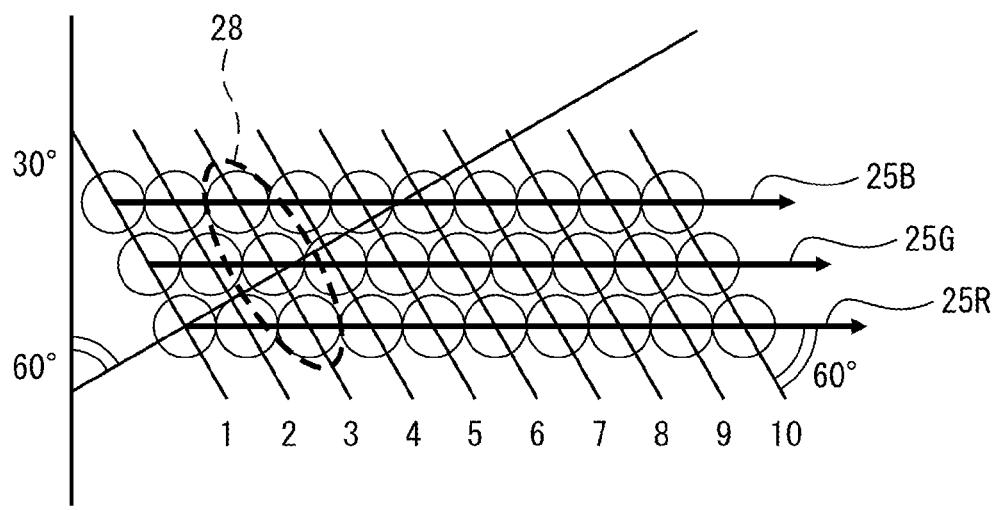
FIG. 10 is a diagram showing a second arrangement example of the fiber arrays 25R, 25G, and 25B.

FIG. 10 is a diagram showing a second arrangement example of the fiber arrays 25R, 25G, and 25B. FIG. 10 also shows cross sections of the end portions of the fiber arrays 25R, 25G, and 25B bundled together by the fiber bundle combiner 12. The second arrangement example concerns the case in which the fiber arrays 25R, 25G, and 25B are bundled together by the fiber bundle combiner 12 to form a fiber bundle so that the fibers form a hexagonal closest packed lattice in the cross section taken perpendicularly to the longitudinal direction thereof. The earlier described tetragonal lattice is the simplest arrangement, but when a tetragon with adjacent two by two (four) fiber cores at each vertex is considered, the spacing between diagonally adjacent cores is √2 times as great as the spacing between horizontally or vertically adjacent cores, creating a correspondingly greater gap. If the fibers are arranged in the hexagonal closest packed lattice as illustrated in the second arrangement example, the fibers can be arranged in a closest packed manner, which serves to reduce the cross-sectional area of the fiber bundle to a minimum when arraying the same number of fibers by stacking them in layers.

In the case of the hexagonal closest packed lattice, the direction of arrangement of the optical fiber set 28 associated with each particular layer is tilted by 60 degrees with respect to the direction of arrangement of each of the fiber arrays 25R, 25G, and 25B indicated by arrows in FIG. 10. More specifically, in the case of the hexagonal closest packed lattice, the RGB optical fiber sets 28, the fibers in each optical fiber set being arranged in the same order along an oblique direction in FIG. 10, are stacked one on top of another in ten layers in the direction tilted by 60 degrees with respect to the direction of arrangement of each of the fiber arrays 25R, 25G, and 25B.

Figure 11:
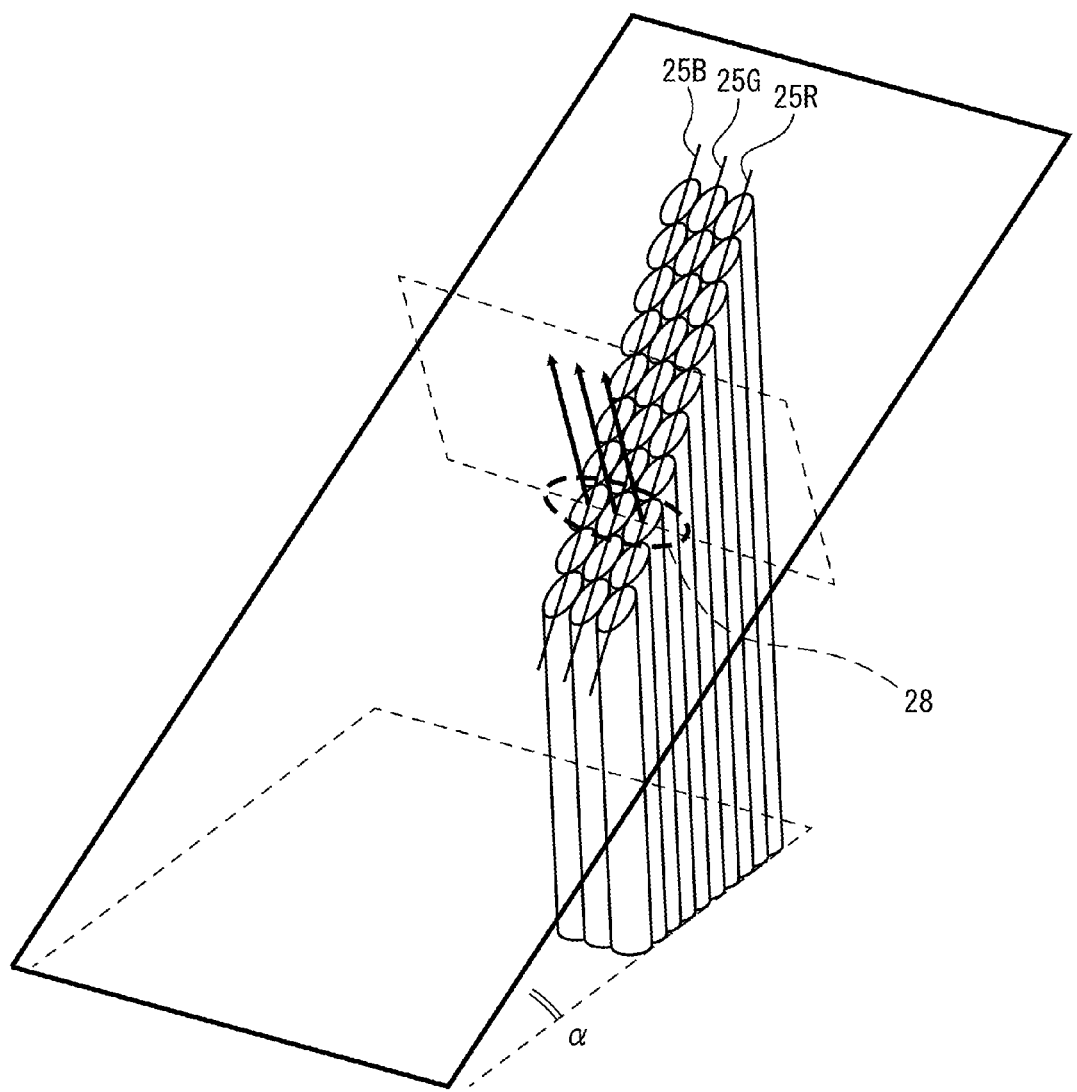
FIG. 11 is a diagram showing the direction in which the exit end faces of the fiber arrays 25R, 25G, and 25B are oriented in the second arrangement example.

FIG. 11 is a diagram showing the direction in which the exit end faces of the fiber arrays 25R, 25G, and 25B are oriented in the second arrangement example. As indicated by arrows in FIG. 11, in the case of the hexagonal closest packed lattice also, the exit optical axes of the RGB optical fibers in each optical fiber set 28 are oriented in the same order and in parallel to each other within the same plane.

As in the case of the tetragonal lattice, in the case of the hexagonal closest packed lattice also, the fiber bundle is ground obliquely so that the exit end faces of the fibers in the optical fiber set 28 associated with one layer are positioned at the same distance from the projection lens 31. More specifically, the fiber bundle is ground obliquely so that the distance from the exit end face to the projection lens 31 becomes the same for each fiber in each of the optical fiber sets 28 indicated by numbers 1 to 10 in FIG. 10. The angle α that the exit end face of each fiber makes with the cross section taken perpendicularly to the longitudinal direction of the fiber shown in FIG. 11 is determined by the refractive index of the fiber, but is preferably set at about 42 degrees, as in the case of the tetragonal lattice. The color laser lights emitted from the fiber bundle are transformed in position and angle by the projection lens 31 and scanned in a two-dimensional direction by the MEMS mirror 32 to project an image on each layer in the volumetric display 1.

Figure 12:
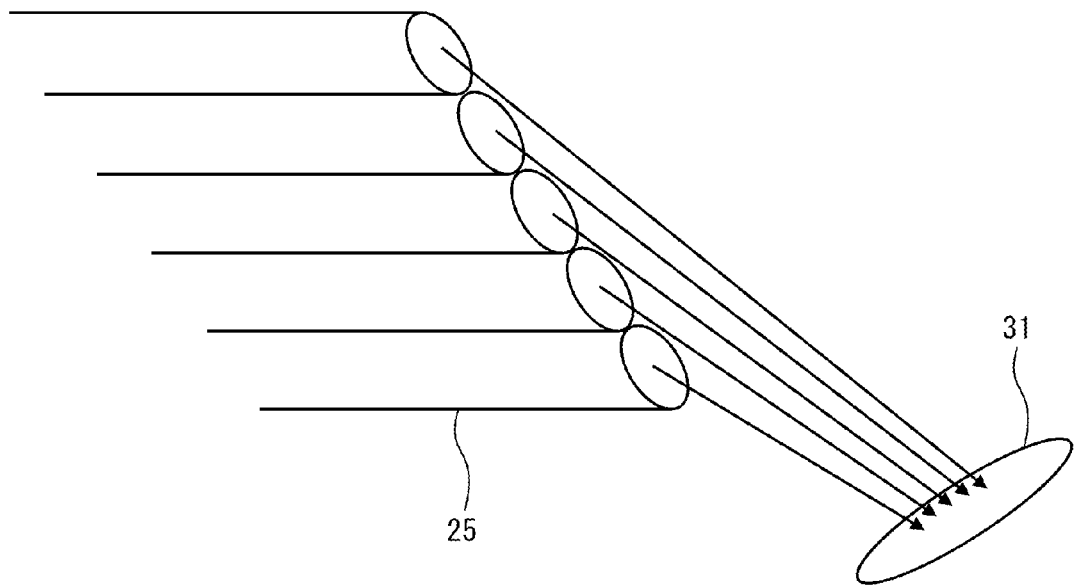
FIG. 12 is a diagram showing the positional relationship between the obliquely ground fiber bundle and the projection lens 31.

FIG. 12 is a diagram showing the positional relationship between the obliquely ground fiber bundle and the projection lens 31. Of the fibers constituting the second fiber array 25 in each of the optical modules 11R, 11G, and 11B, only five fibers are shown in FIG. 12. As shown in FIG. 12, when the fiber bundle is ground obliquely, each color laser light is emitted in an oblique direction. However, since the exit end faces are tilted at the same angle, all of the laser lights are emitted in the same direction, and the RGB lights are projected at equally spaced points on the projection surface. Accordingly, by placing the projection lens 31 in such a manner as to be tilted with respect to the longitudinal direction of each fiber, as shown in FIG. 12, each color laser light can be transformed in position and angle by the projection lens 31 in the same manner as when the fiber bundle is not ground obliquely.

The structure and the method of fabrication of the fiber bundle combiner 12 in the first method in which the exit end face of each fiber is obliquely ground will be described below with reference to FIGS. 13 and 14. While the description so far has been given by assuming that the fiber arrays 25R, 25G, and 25B are each constructed from ten optical fibers, it is assumed for simplicity in FIGS. 13 and 14 that the fiber arrays 25R, 25G, and 25B are formed in a 3-by-4 single-mode fiber array.

Figure 13:
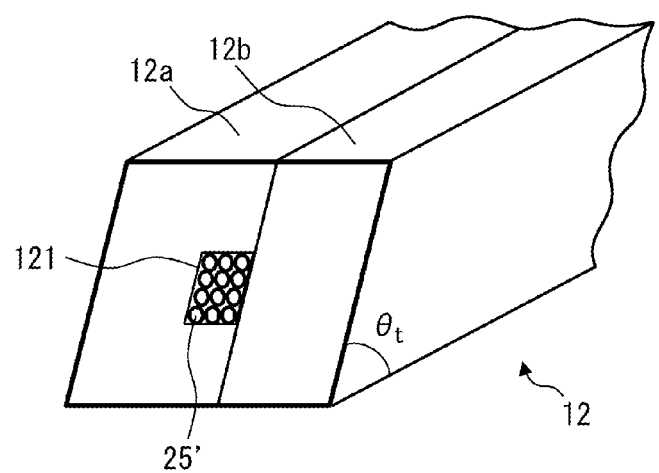
FIG. 13 is a perspective view schematically illustrating the structure of the fiber bundle combiner 12.

FIG. 13 is a perspective view schematically illustrating the structure of the fiber bundle combiner 12 when the exit end face of each fiber is ground obliquely. FIG. 14 is a flowchart illustrating an example of the fabrication method of the fiber bundle combiner 12.

First, using a dicing machine or the like, a silica glass 12a as the material of the fiber bundle combiner 12 is half-diced to a predetermined width and depth to form a rectangular groove 121 in the silica glass 12a (step S11). Next, a 3-by-4 single-mode fiber array 25' is inserted in the rectangular groove 121 (step S12), and a UV adhesive material is injected into the rectangular groove 121 (step S13). Next, a silica-glass cover 12b thinly coated with a UV adhesive material is put on the end of the silica glass 12a obtained in step S13 (step S14). Then, while fixedly holding the silica glass 12a with a jig, the cover 12b and the fibers in the rectangular groove 121 are fixed in place by applying UV radiation (step S15).

Next, the silica glass 12a obtained in step S15 is cut at a predetermined position at a predetermined angle, and after that, the silica glass 12a is ground to generate the face having the earlier described tip angle θ$_t$ (step S16). Finally, an anti-reflective (AR) coating that matches the wavelength used is applied as needed to the end portion of the ground silica glass 12a (step S17). This completes the fabrication of the fiber bundle combiner 12 forming a fiber bundle with the exit end face of each fiber ground obliquely as shown in FIG. 13.

Figure 14:
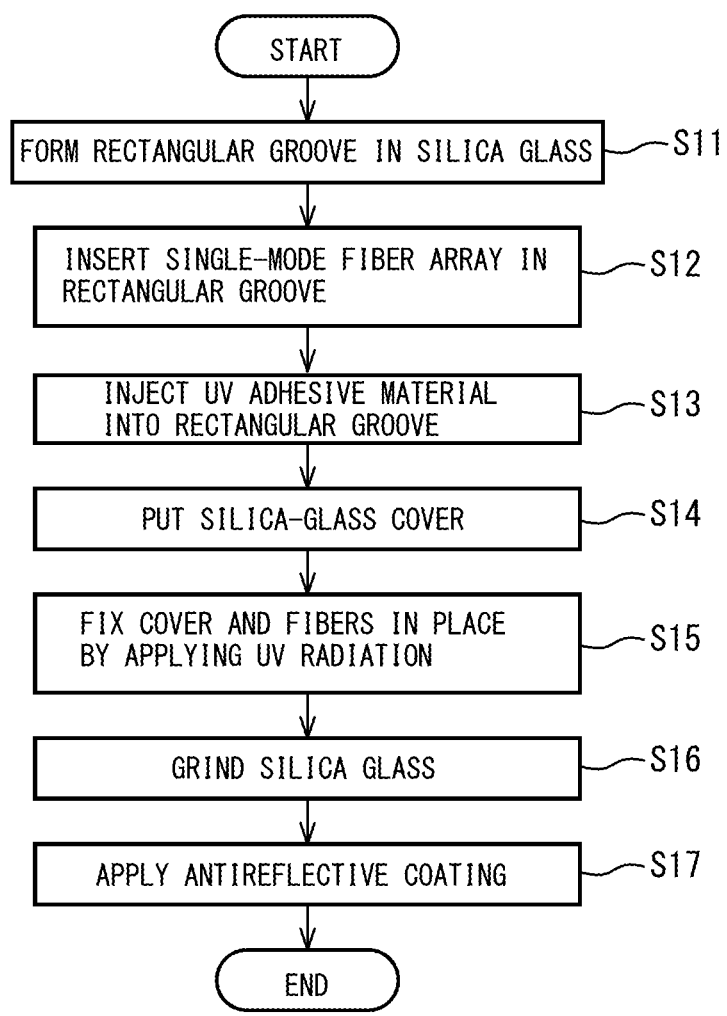
FIG. 14 is a flowchart illustrating an example of the fabrication method of the fiber bundle combiner 12.

In the above-described steps S11 to S14 in FIG. 14, a plurality of structures may be formed and processed at a time on a large-size silica substrate. In that case, the silica substrate is diced in step S16 to obtain each individual fiber bundle combiner 12.

Next, the second method will be described in which a GI fiber is fused to each of the ends of the fiber arrays 25R, 25G, and 25B on the projection lens 31 side thereof.

Figure 15:
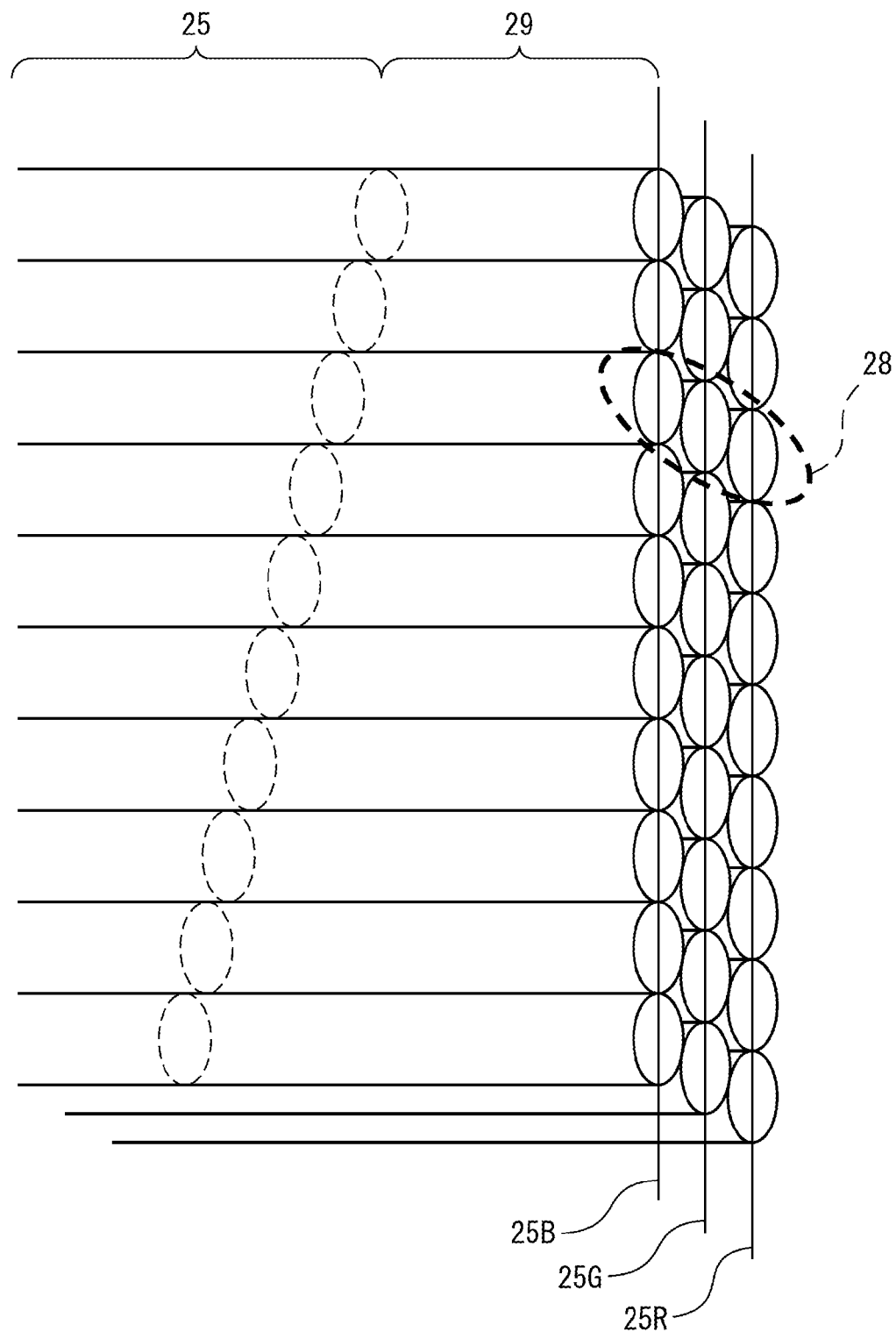
FIG. 15 is a schematic diagram illustrating the fiber bundle formed by fusing a GI fiber 29 to the end of each fiber.

FIG. 15 is a schematic diagram illustrating the fiber bundle formed by fusing a GI fiber 29 to the end of each fiber. In FIG. 15, the fiber arrays 25R, 25G, and 25B are arranged to form a tetragonal lattice in the cross section. The fibers may alternatively be arranged in a hexagonal closest packed lattice.

As shown in FIG. 15, the GI fiber 29, whose length is different for each optical fiber set 28 associated with one layer, is fused to the end of each fiber. The length of each GI fiber 29 is the same for all of the fibers contained in the optical fiber set 28 associated with the same layer. The end of each GI fiber 29 is not ground obliquely, but its exit end face is cut perpendicularly to the longitudinal direction of the fiber. When fusing the GI fibers, the fiber bundle is set by aligning the exit end faces of the fibers so that the distance from the exit end face of the GI fiber 29 to the projection lens 31 becomes the same for all of the optical fibers.

To form such a fiber bundle, first a plurality of optical fibers with a GI fiber fused to the end of each fiber are fabricated to form each of the fiber arrays 25R, 25G, and 25B. Then, the thus fabricated optical fibers are arranged by staggering their fused positions from one optical fiber set 28 to another, and are fixed in place. In this condition, the end of each GI fiber is ground to adjust its length. This completes the formation of the fiber bundle in which the length of the GI fiber 29 is made different for each optical fiber set 28.

The GI fiber 29 is a multi-mode fiber, and the core is larger than the core of each fiber in the fiber arrays 25R, 25G, and 25B. Therefore, the angle at which each color laser light spreads out when emitted from the exit end face varies depending on the length of the GI fiber 29. The fibers in one optical fiber set have the same spreading angle because the GI fiber 29 of the same length is fused to each of the fibers. Since the length of the GI fiber 29 is different for each optical fiber set 28, the spreading angle is different for each optical fiber set 28. Accordingly, in the example of FIG. 15, the fiber bundle is formed in ten layers each having a different spreading angle.

Since the spreading angle is different for each optical fiber set 28, an image can be projected on each layer in the volumetric display 1 by transforming the laser light of each color emitted from the fiber bundle in position and angle by the projection lens 31 and by scanning the laser light in a two-dimensional direction by the MEMS mirror 32. As a result, the focus position can be changed to match each layer in the volumetric display 1 without obliquely grinding the fiber bundle, and thus, the same effect can be achieved as when the fiber length is changed for each optical fiber set 28 (that is, when the position of each exit end face is moved backward or forward with respect to the projection lens 31).

Instead of varying the GI fiber length for each optical fiber set 28, GI fibers having the same length but having different refractive indices may be used.

Using one or the other of the two methods described above, the focus positions of the ten sets of RGB laser lights emitted from the light source unit 10 are adjusted so as to match the ten layers in the volumetric display 1. In this way, the projection device can be achieved that projects a multicolored stereoscopic image, while enhancing the efficiency of light utilization by emitting the laser lights of different colors from the fiber bundle formed by the fiber bundle combiner.

REFERENCE SIGNS LIST 1 volumetric display
10 light source unit
11, 11R, 11G, 11B optical module
12 fiber bundle combiner
21 LD array
24, 25, 25R, 25G, 25B fiber array
28 optical fiber set
30 projecting unit
31 projection lens
32 MEMS mirror

What is claimed is:
1. A light source device comprising:
a plurality of first optical devices which generate red laser light;
a plurality of first optical fibers through each of which the red laser light from a corresponding one of the plurality of first optical devices is guided;
a plurality of second optical devices which generate green laser light;
a plurality of second optical fibers through each of which the green laser light from a corresponding one of the plurality of second optical devices is guided;
a plurality of third optical devices which generate blue laser light;
a plurality of third optical fibers through each of which the blue laser light from a corresponding one of the plurality of third optical devices is guided; and
a fiber bundle combiner which forms a fiber bundle by fixedly holding together end portions of the plurality of first optical fibers, the plurality of second optical fibers, and the plurality of third optical fibers in such a manner that a plurality of optical fiber sets, each comprising three optical fibers one from the plurality of first optical fibers, one from the plurality of second optical fibers, and one from the plurality of third optical fibers, are stacked in layers,
wherein the plurality of first optical fibers, the plurality of second optical fibers, and the plurality of third optical fibers emit laser lights from exit end faces thereof so that the laser lights from different ones of the plurality of optical fiber sets are focused at different depth positions, and
a GI fiber whose length is different for each of the optical fiber sets is fused to the end portion of each of the plurality of first optical fibers, the plurality of second optical fibers, and the plurality of third optical fibers.

2. The light source device according to claim 1, wherein the fiber bundle combiner fixedly holds together the optical fibers so that the plurality of first optical fibers, the plurality of second optical fibers, and the plurality of third optical fibers form a hexagonal closest packed lattice in a cross section taken perpendicularly to the longitudinal direction of the fiber bundle, and
the plurality of optical fiber sets stacked in layers are each arranged in a direction tilted by 60 degrees with respect to a direction in which the plurality of first optical fibers, the plurality of second optical fibers, and the plurality of third optical fibers are respectively arranged.

3. The light source device according to claim 1, wherein the fiber bundle combiner fixedly holds together the optical fibers so that the plurality of first optical fibers, the plurality of second optical fibers, and the plurality of third optical fibers form a tetragonal lattice in a cross section taken perpendicularly to the longitudinal direction of the fiber bundle, and
the plurality of optical fiber sets stacked in layers are each arranged in a direction perpendicular to a direction in which the plurality of first optical fibers, the plurality of second optical fibers, and the plurality of third optical fibers are respectively arranged.

4. The light source device according to claim 1, wherein exit optical axes of the first optical fiber, second optical fiber, and third optical fiber in each of the optical fiber sets are oriented in the same order and in parallel to each other within the same plane.

5. A projection device comprising:
a light source unit which emits a plurality of sets of red, green, and blue laser lights; and a projecting unit which deflects and scans each of the plurality of sets of the laser lights in a two-dimensional manner and thereby projects images formed by the plurality of sets of the laser lights onto different depth positions, wherein the light source unit comprises:

a plurality of first optical devices which emit red laser light;

a plurality of first optical fibers through each of which the red laser light from a corresponding one of the plurality of first optical devices is guided;

a plurality of second optical devices which emit green laser light;

a plurality of second optical fibers through each of which the green laser light from a corresponding one of the plurality of second optical devices is guided;

a plurality of third optical devices which emit blue laser light;

a plurality of third optical fibers through each of which the blue laser light from a corresponding one of the plurality of third optical devices is guided; and a fiber bundle combiner which forms a fiber bundle by fixedly holding together end portions of the plurality of first optical fibers, the plurality of second optical fibers, and the plurality of third optical fibers in such a manner that a plurality of optical fiber sets, each comprising three optical fibers one from the plurality of first optical fibers, one from the plurality of second optical fibers, and one from the plurality of third optical fibers, are stacked in layers, wherein each of the optical fiber sets emits one of the plurality of sets of the laser lights, the plurality of first optical fibers, the plurality of second optical fibers, and the plurality of third optical fibers emit laser lights from exit end faces thereof so that the laser lights from different ones of the plurality of optical fiber sets are focused at different depth positions, and a GI fiber whose length is different for each of the optical fiber sets is fused to the end portion of each of the plurality of first optical fibers, the plurality of second optical fibers, and the plurality of third optical fibers.

* * * * *